United States Patent
Zhao et al.

(10) Patent No.: US 8,810,514 B2
(45) Date of Patent: Aug. 19, 2014

(54) SENSOR-BASED POINTING DEVICE FOR NATURAL INPUT AND INTERACTION

(75) Inventors: Ji Zhao, Bejing (CN); Tong Yuan, Bejing (CN); Min Wang, Beijing (CN); Chunhui Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1008 days.

(21) Appl. No.: 12/705,378

(22) Filed: Feb. 12, 2010

(65) Prior Publication Data

US 2011/0199301 A1 Aug. 18, 2011

(51) Int. Cl.
*G06F 3/033* (2013.01)
*G09G 5/08* (2006.01)

(52) U.S. Cl.
USPC .......................................... 345/163; 345/156

(58) Field of Classification Search
CPC ................. G06F 2203/0334; G06F 2203/033; G06F 2203/0335; G06F 2203/0337
USPC ................................................. 345/156–173
See application file for complete search history.

(56) References Cited

U.S. PATENT DOCUMENTS

| | | | |
|---|---|---|---|
| 7,365,736 B2 | 4/2008 | Marvit et al. | |
| 8,125,445 B1 * | 2/2012 | Anderson | 345/157 |
| 2004/0140962 A1 | 7/2004 | Wang et al. | |
| 2005/0062719 A1 * | 3/2005 | Hinckley et al. | 345/163 |
| 2005/0280636 A1 * | 12/2005 | Hildebrandt et al. | 345/173 |
| 2006/0044260 A1 * | 3/2006 | Harley et al. | 345/156 |
| 2006/0178212 A1 | 8/2006 | Penzias | |
| 2006/0262545 A1 * | 11/2006 | Piepgras et al. | 362/373 |
| 2006/0267933 A1 * | 11/2006 | Tai et al. | 345/157 |
| 2007/0176896 A1 | 8/2007 | Gritton et al. | |
| 2007/0216648 A1 * | 9/2007 | Lo et al. | 345/163 |
| 2007/0242042 A1 | 10/2007 | Kelly | |
| 2007/0259717 A1 | 11/2007 | Mattice et al. | |
| 2007/0290997 A1 * | 12/2007 | Harley et al. | 345/157 |
| 2008/0231595 A1 * | 9/2008 | Krantz et al. | 345/156 |
| 2008/0291163 A1 | 11/2008 | Liberty | |
| 2009/0160771 A1 * | 6/2009 | Hinckley et al. | 345/163 |
| 2010/0026623 A1 | 2/2010 | Moussavi | |
| 2010/0029242 A1 | 2/2010 | Orr et al. | |
| 2010/0039394 A1 | 2/2010 | Moussavi | |
| 2010/0124949 A1 | 5/2010 | Demuynck et al. | |
| 2012/0170758 A1 * | 7/2012 | Eppolito | 381/17 |
| 2012/0262407 A1 * | 10/2012 | Hinckley et al. | 345/173 |

OTHER PUBLICATIONS

Fuhrmann, et al, "Bluewand—A Versatile Remote Control and Pointing Device", Dec. 2004, Retrieved on May 27, 2010 at <<http://141.3.40.244/research/documents/p2p/2003/fuhrmann03bluewand-KiVS.pdf>>8 pgs.

3DConnexion, http://www.3dconnexion.com, retrieved on Dec. 9, 2009, 1 page.

Balakrishnan, et al., "The Rockin'Mouse: integral 3D manipulation on a plane", ACM, CHI '97: Proceedings of the SIGCHI conference on Human factors in computing systems, 1997, pp. 311-318.

(Continued)

*Primary Examiner* — Ricardo L Osorio (74) *Attorney, Agent, or Firm* — Carole Boelitz; Micky Minhas; Lee & Hayes PLLC (57) ABSTRACT

A pointing or input device is generally cylindrical or puck-shaped, and has various sensors for sensing 2D, 3D, and high degree of freedom motion for more natural user interaction.

20 Claims, 7 Drawing Sheets

(56) References Cited

OTHER PUBLICATIONS

Buyukkokten, et al., "Power Browser: Efficient Web Browsing for PDAs", ACM, CHI '00: Proceedings of the SIGCHI conference on Human factors in computing systems, 2000, pp. 430-437/.

Cohen, et al., "A basic hand gesture control system for pc applications", IEEE Computer Society, AIPR '01: Proceedings of the 30th on Applied Imagery Pattern Recognition Workshop, p. 74.

Froehlic, et al., "The GlobeFish and the GlobeMouse: Two New Six Degree of Freedom Input Devices for Graphics Applications", ACM, CHI'06: Proceedings of the SIGHCHI conference on Human Factors in computing systems, 2006, pp. 191-199.

Frohlich, et al., "The Cubic Mouse: A New Device for Three-Dimensional Input", ACM, CHI '00: Proceedings of the SIGCHI conference on Human Factors in computing systems, 2000, pp. 526-531.

Guimbretierre et al., "Fluid Interaction with High-resolution Wall-size Displays", ACM, UIST '01: Proceedings of the 14th annual ACM symposium on User interface software and technolgoy, New York, USA 2001, 10 pages.

Hachet, et al., "The cat for efficient 2d and 3d interaction as an alternative to mouse adaptations", ACM, VRST '03: Proceedings of the ACM symposium on Virtual reality software and technology, New York, USA, 2003.

Hancock, et al., "Shallow-Depth 3D Interaction: Design and Evaluation of One-, Two- and Three-Touch Techniques", ACM, CHI '07: Proceedings of the SIGCHI conference on Human factors in computing systems, New York, USA, 2007, 10 pages.

Hinckley, et al., "Sensing Techniques for Mobile Interaction", ACM, 'UIST '00: Proceedings of the 13th annual ACM symposium on User interface software and technology, New York USA, 2000, pp. 91-100.

Hinckley, et al., "Usability Analysis of 3D Rotation Techniques", ACM, UIST '97: Proceedings of the 10th annual ACM symposium on User interface software and technology, New York USA 1997, 10 pages.

Kajastila, et al., "A Gesture-based and Eyes-free Control Method for Mobile Devices", ACM, CHI EA '09: Proceedings of the 27th international conference extended abstracts on Human factors in computing systems, MA, USA 2009, pp. 3559-3564.

Karlson, et al., "AppLens and LaunchTile: Two Designs for One-Handed Thumb Use on Small Devices", ACM, CHI 2005, OR, USA, 2005, pp. 201-210.

Karlson, et al., "One-Handed Touchscreen Input for Legacy Applications", ACM, CHI '08: proceedings of the 26th annual SIGCHI conference on Human factors in computing systems, Florence, Italy 2008, pp. 1339-1408.

Lee, "Towards a Quantitative Analysis of Audio Scrolling Interfaces", ACM, CHI 2007, CA, USA, 2007, 6 pages.

Perry, et al., "Evaluating one handed thumb tapping on mobile touchscreen devices", Canadian Information Processing Society, GI 2008: Graphics Interface Conference 2008, Ontario, Canada, 2008, pp. 57-64.

Rekimoto, "Tilting Operations for Small Screen Interfaces", ACM, UIST '96: Proceedings of the 9th annual ACM symposium on User interface software and technology, New York, USA, 1996, 2 pages.

Subramanian, et al., "Investigation of Subjective Preferences in Multiple Degrees-of-Freedom Inputs", ACM, CHI 2003 extended abstracts on Human factors in computing systems, Flroiday, USA, 2 pages.

Teather, et al., "Guidelines for 3D Positioning Techniques", ACM, Future Play 2007: Proceedings of the 2007 conference on Future Play, New York, USA 2007, pp. 8.

"Wii Remote", retrieved on Dec. 10, 2009 at http://en.wikipedia.org/wiki/Wii-Remote.

Zhai, et al., "Quantifying Coordination in Multiple DOF Movement and Its Application to Evaluating 6 DOF Input Devices", ACM, CHI 98: Proceedings of the SIGCHI conference on Human factors in computing systems, New York, USA 1998, 9 pages.

\* cited by examiner

SENSOR-BASED POINTING DEVICE FOR NATURAL INPUT AND INTERACTION

BACKGROUND

The computer mouse is a popular human input device for interaction with computers and similar devices. However, a computer mouse has to be placed and operated by users on a smooth surface, and can therefore only support 2D operations such as drag and move. It cannot intuitively support 3D operations, such as vertical motions or 3D rotation. Although there are other human input devices that support 3D interaction with specific computing devices, they have not found universal or even wide-spread acceptance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The disclosure describes a human input device that can be used a general pointing device supporting both 2D, 3D, and high degree of freedom operations. The human input device has a generally puck-shaped body and can be held by fingers of one hand. The human input device has touch-sensitive and pressable top surfaces and a surface translation sensor at its bottom, allowing the device to function as a traditional mouse. The human input device in one embodiment has a touch-sensitive circumference to detect the user's holding pattern. It can also have various built-in sensors to capture the pose of the device when held aloft, including a height sensor that senses the relative height of the device from a surface.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The disclosure describes techniques for using a computer mouse or human input device to support 2D, 3D, and high degree of freedom operations. The human input device has a generally puck-shaped body and can be grasped by one hand. It can have touch-sensitive, pressable inner and outer top surfaces that can function as "left" and "right" keys of a traditional mouse. The human input device also has a surface translation sensor at its bottom to capture a mouse-type movement of the human input device across a surface on which the human input device is placed. The human input device also has touch-sensitive circumference to detect the user's holding pattern to determine a direction or angular orientation of the device relative to the grasping human hand. There are also various other built-in sensors, such as a tri-axial accelerometer, a gyroscope, a compass, and a surface height sensor, to capture movement of the human input device in air when it is raised from the surface. One or more of these sensors can also be used together to form a pose sensor.

Figure 1:
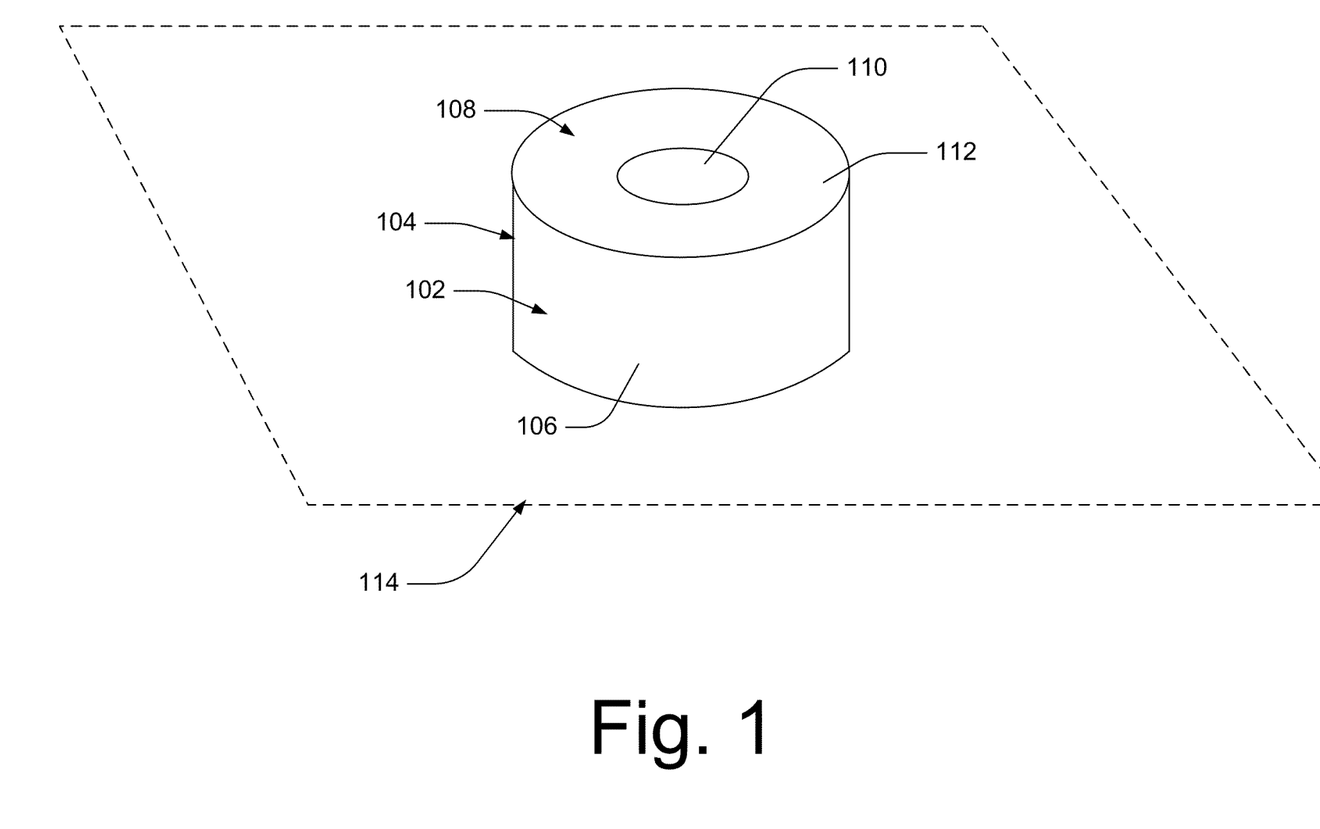
FIG. 1 is a perspective view of an exemplary human input device.

This brief introduction, subsequent section titles, and corresponding summaries, are provided for the reader's convenience and are not intended to limit the scope of the claims Example Input Device FIG. 1 shows an exemplary human input device 102. Human input device 102 comprises a body 104 that is generally puck-shaped. Body 104 has a circumference 106 that is sized to be comfortably grasped between two fingers of a human hand, such as the thumb and index finger or the thumb and middle finger. In the described embodiment, body 104 of human input device 102 is approximately two inches in diameter. Its height is approximately one inch.

In the embodiment of FIG. 1, body 104 is cylindrical, having a curved, circular, and cylindrical circumference 106. In other embodiments, body 104 might be hexagonal or some other generally circular shape comprising five or more straight sides. Input device 102 has a top surface 108 that is slightly concave. Top surface 108 comprises an inner surface 110 and an outer, annular, concave surface 112 that surrounds inner surface 110. Inner surface 110 is round in this embodiment, and is in the center of top surface 108. Inner surface 110 can be flat or slightly convex in order to delineate it from outer surface 112. When held between the thumb and middle finger, the index finger can rest on top surface 108, or on inner surface 110 of top surface 108.

Input device 102 has a generally flat bottom surface (not shown) suitable for sliding across a planar surface 114 on which input device 102 is placed. This allows input device 102 to be used as a conventional pointing device such as a traditional computer mouse.

Figure 2:
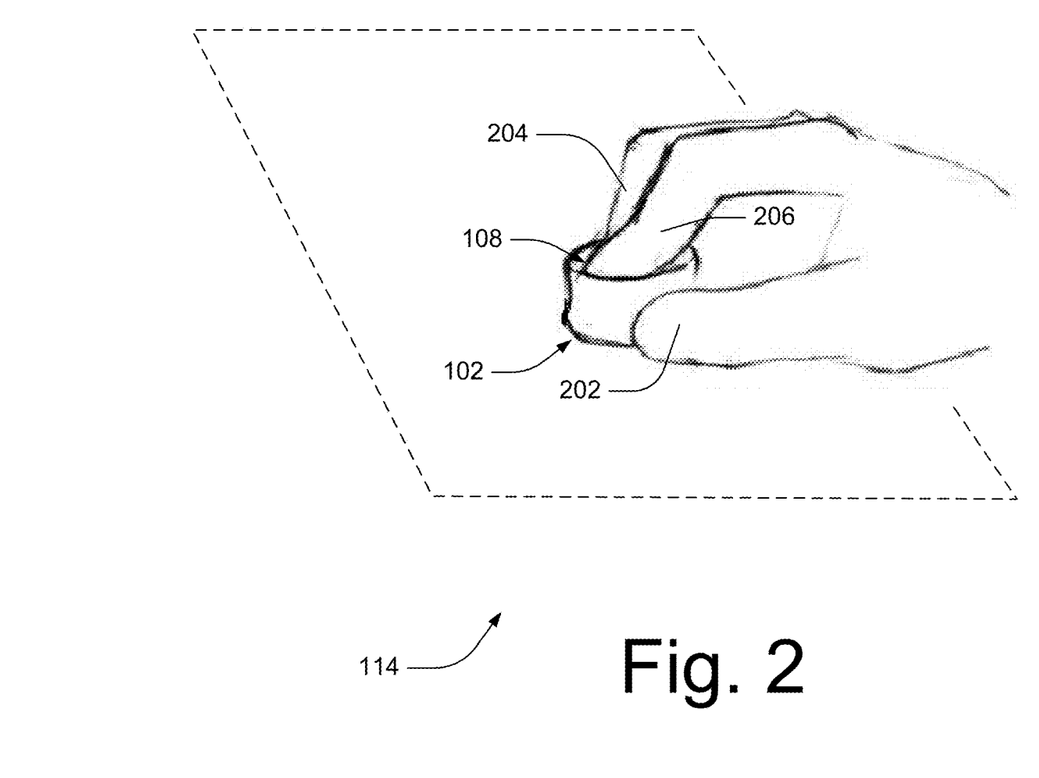
FIG. 2 is a diagram showing how the exemplary human input device might be held by fingers of a human hand.

FIG. 2 shows one example of how input device 102 might be held by the fingers of a human hand. In this example, input device 102 is held between the thumb 202 and middle finger 204, and the index finger 206 rests on top surface 108 of input device 102.

Referring again to FIG. 1, top surface 108 can be touch-sensitive, using capacitive touch technology. Specifically, inner surface 110 can be touch-sensitive, allowing the device to detect placement and movement of a human finger over inner surface 110. The device can sense when a user touches inner surface 110, and can sense how a user moves their finger across inner surface 110. For example, touch-sensitive inner surface 110 allows the device to detect the direction in which a user slides their finger across inner surface 110.

Outer surface 112 can also be touch-sensitive, allowing input device 102 to sense placement and/or movement of a finger across or around this surface. The device can detect the position of a user's finger around outer surface 112 and can detect the sliding of a user's finger around outer surface 112. A user can slide their finger circularly around this surface to provide control input to a computer with which the input device 102 is associated.

In addition to being touch-sensitive, both inner surface 110 and outer surface 112 can be pressable or clickable. Specifically, they can be separately pressed by the user to initiate some type of action. For example, inner surface 110 might be pressable to act as a first or primary action key or button, similar to the left button of a traditional mouse. Outer surface 112 might be pressable to act as a second or secondary action key or context key, similar to the right button of a traditional mouse.

The circumference 106 of input device 102 can also be touch-sensitive. This allows input device 102 to detect where a user's fingers are placed as the user grasps input device 102. In the described embodiment, the cylindrical side or circumference 106 of input device 102 forms a continuous, curved, 360 degree touch surface. In other embodiments, the circumference might comprise several discrete curved or straight segments that are individually sensitive to touch.

Figure 3:
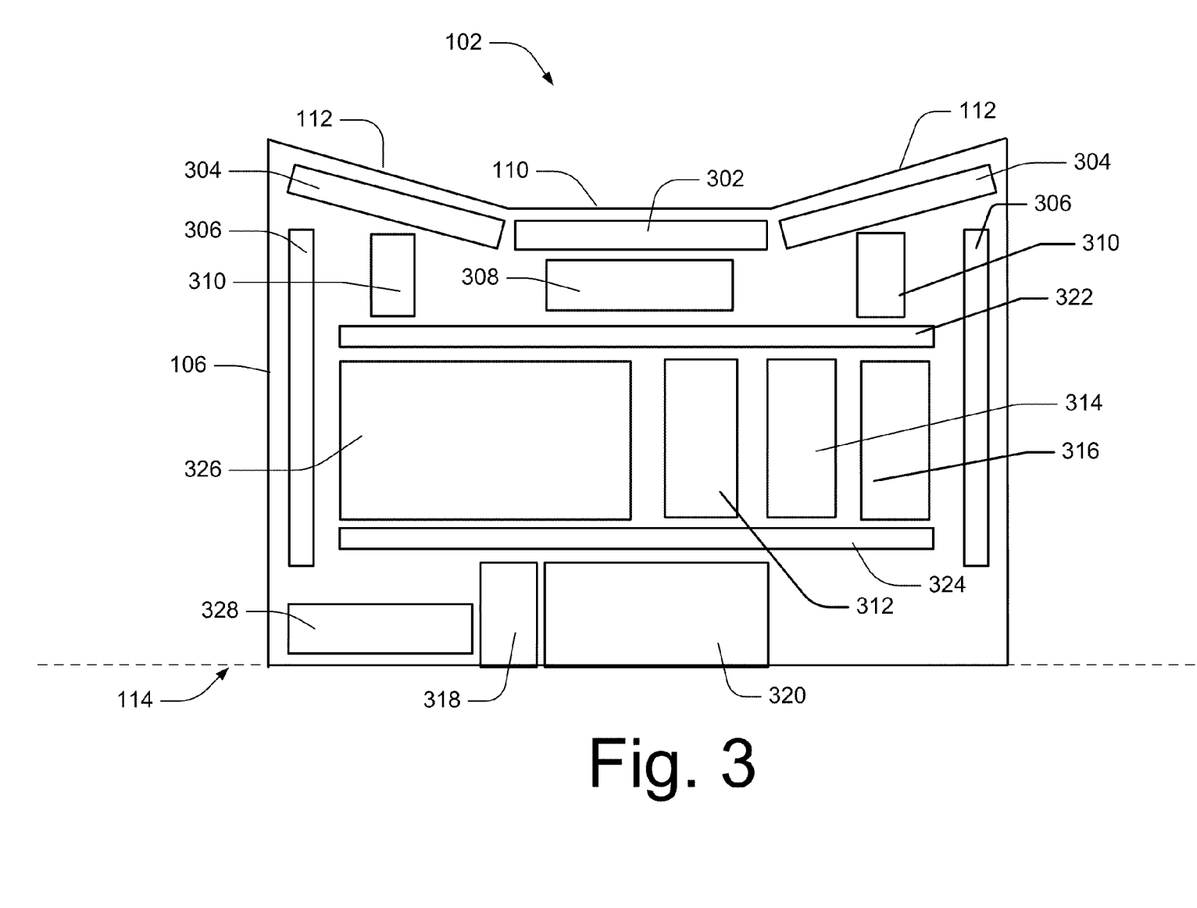
FIG. 3 is a cross-sectional view of one embodiment of the exemplary human input device.

FIG. 3 is a cross-sectional view of one embodiment of input device 102, showing one possible arrangement of elements within body 104 of input device 102. Other arrangements are possible. FIG. 3 illustrates elements already described with reference to FIG. 1, as well as additional elements that are not externally visible.

In order to implement the touch-sensitive features already described, input device 102 includes an inner top touch sensor 302, an outer top touch sensor 304, and one or more side touch sensors such as side touch sensor 306. Inner top touch sensor 302 is substantially the same size and shape as inner surface 110 and underlies or forms inner surface 110. Outer top touch sensor 304 is generally the same size and shape as annular outer surface 112 and underlies or forms outer surface 112. Side touch sensor 306 underlies or lies within cylindrical circumference 106. Side touch sensor 306 can be a single continuously curved sensor, or it can comprise a plurality of sensors arranged around the inside of circumference 106. Note that although these touch sensors are illustrated as being separate from the shell or body 104 of input device 102, they might be integral with body 104 or formed using some different physical arrangement.

Input device 102 can also have an inner top button actuator 308 and an outer top button actuator 310. These are elements that respond to pressure or physical movement to provide an on/off or switched signal. Inner top button actuator 308 underlies inner surface 110 and is responsive to pressing or depressing inner surface 110. In other words, inner top button actuator 308 detects when a user presses inner surface 110. Outer top button actuator 310 underlies outer surface 112 and is responsive to pressing or depressing outer surface 112. Outer top button actuator 310 thus detects when a user presses outer surface 112. Thus, both inner surface 110 and outer surface 112 are pressable by a user to provide different inputs using input device 102.

In addition to the touch and press sensitive elements described above, input device 102 has multiple sensors that collectively sense the pose of input device 102. These sensors include a tri-axial accelerometer 312, a gyroscope 314, a compass 316, a surface height sensor 318, and a surface movement or translation sensor 320. Tri-axial accelerometer 312, gyroscope 314, and compass 316 can be located within body 104 of input device 102. Surface height sensor 318 and surface translation sensor 320 are positioned at the bottom of input device 102 to provide height and translation data relative to surface 114.

Tri-axial accelerometer 312 is configured to sense translation of input device 102. For example, tri-axial accelerometer 312 can sense linear acceleration of input device 102 in three dimensions.

Gyroscope 314 is configured to sense rotation of input device 102. For example, gyroscope 314 can sense an angular motion of input device 102 in three dimensions. The output offset of the gyroscope changes in different environments and has a small drift. To counter for drift, the gyroscope output is sampled several times at startup to determine initial offset. In addition, the gyroscope is reset or zeroed whenever a user presses inner surface 110.

Compass 316 is configured to sense geographic orientation of input device 102. For example, compass 316 can be a digital compass that senses the absolute orientation of input device 102 relative to earth geomagnetic coordinates.

Surface height sensor 318 detects the height of input device 102 relative to surface 114 when input device 102 is raised from surface 114. For example, surface height sensor 318 can use infrared techniques and include an infrared light source, optical sensor, and infrared pass filter.

Surface translation sensor 320 senses translational movement of input device 102 when input device 102 rests on and slides across surface 114, and thus detects mouse-like movement across surface 114.

Note that many of the described sensors can be used as motion sensors, to detect motion of input device 102. For example, accelerometer 312, gyroscope 314, compass 316, surface height sensor 318, and surface translation sensor 320 can all be used as motion sensors to detect movement of input device 102 and to ultimately control cursor movement or other on-screen movement.

In addition to the described sensors, input device 102 includes controllers and logic associated with the sensors, as well as communications elements for communicating user inputs to a device such as a computer. In this embodiment, the controllers and logic are implemented on two printed circuit boards (PCBs) inside input device 102, i.e., a top PCB 322 and a bottom PCB 324. Top PCB 322 is a logic and sensor board that contains control logic for input device 102 and connects to the various touch sensors and buttons within input device 102.

Bottom PCB 324 in the illustrated embodiment is a mouse controller that is used in conjunction with surface translation sensor 320 to monitor and report mouse-type movement of input device 102. Inner top button actuator 308 and outer top button actuator 310 can be used as inputs to bottom PCB 324 to provide further mouse-like functionality. Inner top button actuator 308 can be utilized as a "left" mouse click and outer top button actuator 310 can be utilized as a "right" mouse click.

Input device 102 also includes a battery 326 and a power charger 328 that provide power to input device 102. For example, battery 326 might comprise a rechargeable lithium-ion battery. Power charger 328 is configured to charge battery 326. In one example, power charger 328 is connected through a cord (not shown) to a power source to charge battery 326. In another example, power charger 328 can use wireless power techniques to connect to a power source to charge battery 326 wirelessly. With wireless power techniques, input device 102 can be sealed and enabled to work in different environments, especially outdoor environment.

Figure 4:
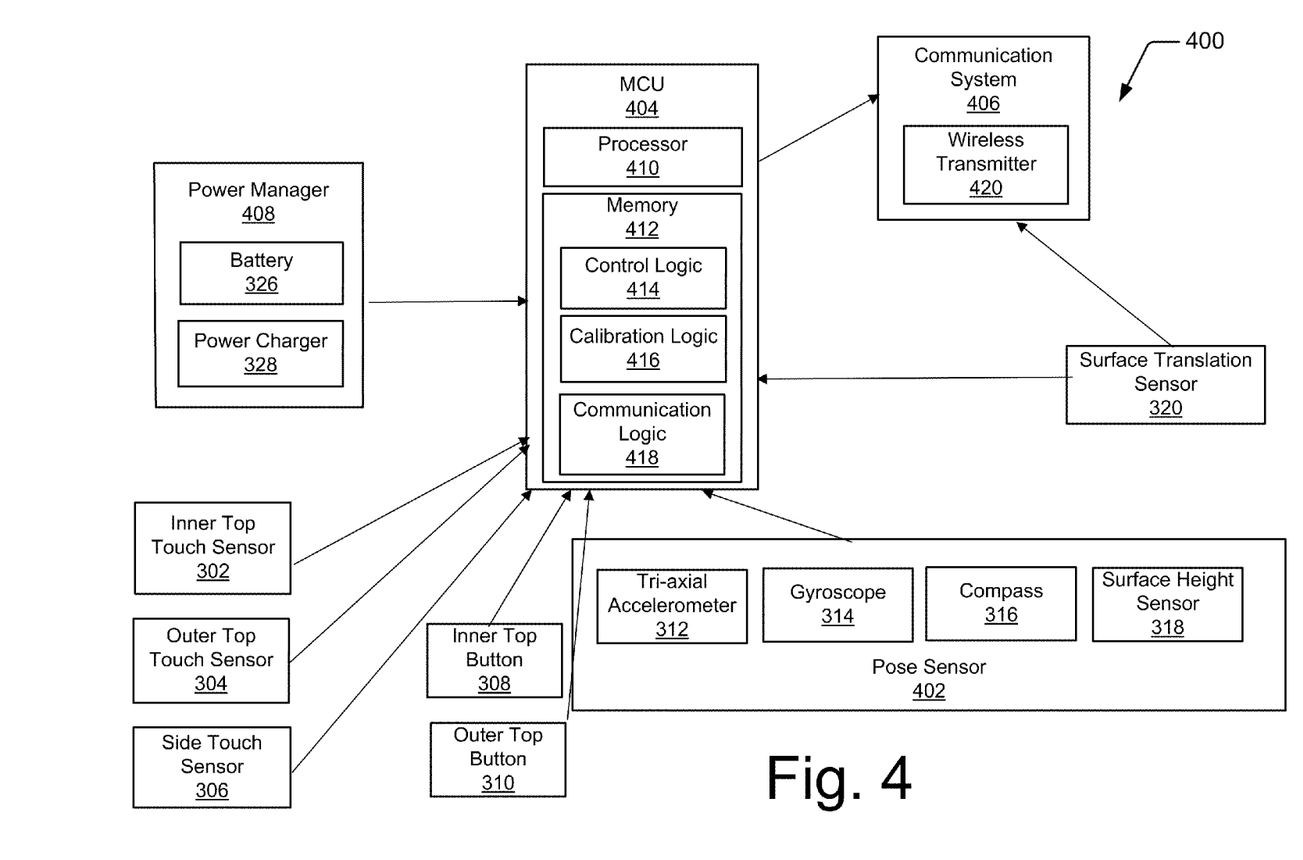
FIG. 4 is a diagram showing an exemplary logical architecture of the exemplary human input device.

FIG. 4 shows an exemplary logical architecture of input device 102. This architecture includes components already described: inner top touch sensor 302, outer top touch sensor 304, side touch sensor 306, inner top button actuator 308, outer top button actuator 310, tri-axial accelerometer 312, gyroscope 314, compass 316, surface height sensor 318, and surface translation sensor 320.

Tri-axial accelerometer 312, gyroscope 314, compass 316, and surface height sensor 318 can be separate components as shown in FIG. 3. In one embodiment, one or more of these components form what is referred to as pose sensor 402, which detects the relative or absolute pose of input device 102. In some embodiments, different ones of the touch sensors can also be considered or utilized as part of the pose sensor 402.

Pose sensor 402 allows input device 102 to determine and continuously update its pose (elevation, orientation, and horizontal position) relative to a user, and in some cases relative to earth geomagnetic coordinates. In order to determine pose relative to a user, some initial or ongoing calibration may be utilized, as will be described in a subsequent section of this disclosure.

In the embodiment of FIG. 4, pose sensor 402 includes or utilizes tri-axial accelerometer 312, gyroscope 314, compass 316, and surface height sensor 318 to capture pose information through horizontal translational movement, rotational movement, vertical movement, height of input device above surface 114, movement relative to surface 114, geographic orientation, etc.

In addition to the components already described, the architecture of input device 102 includes a micro controller unit (MCU) 404, a communication system 406, and a power manager 408. MCU 404 is configured to receive and process data from other components of input device 102. Communication system 406 is configured to transfer data between input device 102 and a computing device (not shown) with which input device 102 is associated. Power manager 408 is configured to manage battery 326 and power charger 328.

MCU 404 comprises one or more processors 410, a memory 412, and at least a control logic 414, a calibration logic 416, and a communication logic 418 stored in memory 412.

Generally, memory 412 contains computer-readable instructions that are accessible and executable by processor 410. Memory 412 may comprise a variety of computer readable storage media, including both volatile and non-volatile storage media.

Any number of program modules can be stored in the memory, including by way of example, an operating system, one or more applications, other program modules, and program data. Each of such program modules and program data (or some combination thereof) may implement all or part of the logic and functionality described herein.

Control logic 414 in the described embodiment comprises one or more program modules configured to manage and monitor the various components of input device 102, to convert data to a format expected by an associated computer or other device, and to communicate with the associated computer or other device.

In the embodiment of FIG. 4, calibration logic 416 comprises one or more program modules that receive and process sensor data from various sensors to capture an initial and ongoing pose of input device 102 relative to a user and/or the user's hand. These various sensors may include one or more of top touch sensor 302, outer top touch sensor 304, side touch sensor 306, inner top button actuator 308, outer top button actuator 310, surface translation sensor 320, and one or more components of pose sensor 402. Calibration logic 416 can operate continuously to dynamically determine angular orientation of input device 102 relative to the human hand.

Communication logic 418 is configured to control communication system 406 to transmit data between input device 102 and the computing device.

Communication system 406 can use either wired or wireless techniques to transmit data. Communication system 406 can include a wireless transmitter 420 to use one or more wireless techniques to transmit data describing movement of input device 102. The one or more wireless techniques can include wi-fi, infrared, bluetooth, or any other wireless technique. For example, communication system 406 can transmit data to the computing device such as a PC (not shown) through a 2.4G channel to a USD dongle of the PC. The USB dongle reports itself as a human interface device (HID) so that application software on PC can access sensor data transmitted by input device 102 without customized drivers.

Power manager 408 manages battery 326 and power charger 328 to provide power to input device 102 including MCU 404.

MCU 404, communication system 406, and power manger 408 can be implemented within top PCB 322.

Exemplary Operation

Input device 102 can be used as a 2D, 3D or high degree of freedom input device.

Input device 102 offers at least the same level of 2D movement signals as a traditional computer mouse. For example, inner top button actuator 308 and outer top button actuator 310 can be utilized as a "left" and "right" mouse clicks, respectively. Surface translation sensor 320 can detect mouse-like movement across surface 114. These are the traditional mouse functions and they can be emulated by input device 102.

Input device 102 can further provide six degree of freedom (6-DOF) or high degree of freedom (HDOF) input functions, such as 3D translation and rotation input capabilities, based on an integration of functionality provided by the touch sensitive surfaces and pose sensor 402.

There are at least two basic user modes of input device 102. One is a "finger mode" in which the user can manipulate input device 102 on a surface. In this mode, input device 102 can behave like a traditional mouse, but with additional and more natural functions such as rotation or scrolling controlled by rotating input device 102. Specifically, in order to rotate or scroll a displayed item or object, the user simply rotates input device 102 around a vertical axis.

The other user mode is a "hold mode," in which the user holds input device 102 aloft and can manipulate input device 102 as a 6-DOF input device.

In this embodiment, input device 102 is configured to emulate a conventional mouse when placed upon a planar surface. When input device 102 is removed from such a surface, input device 102 works as a 3D or 6-DOF input device. Placement upon or removal from the planar surface can be detected by surface height sensor 318. Alternatively, surface translation sensor 320 may be an optical sensing device that reports a number referred to as "usable surface features." When this number is zero, indicating that surface translation sensor 320 is basically inoperable, it is assumed that input device 102 is not on a surface and input device 102 switches to its 3D or 6-DOF mode.

The various sensors allow more natural human interactions with displayed computer data and graphics through input device 102. Basic interactions include rotation, sliding, 3D input, and basic mouse input.

For rotation of on-screen objects, input device 102 can be rotated around its central vertical axis. Furthermore, input device 102 can be placed with its circumference 106 on surface 114, and rolled over the surface to produce rotation around a horizontal axis.

Sliding interactions include sliding fingers across top surface 108 to translate on-screen objects. In addition, a user may slide a finger around outer surface 112 to move or rotate objects.

Surface height sensor 318 can sense and report the approximate height of input device 102 from the surface for operations such as zooming, switching windows, menu item selection, etc.

Pose Calibration

A user can initially grasp input device 102 in any random angular orientation. Prior to operation, input device 102 can determine its pose or orientation relative to the user. Described below are three examples of how this calibration might be performed.

Figure 5:
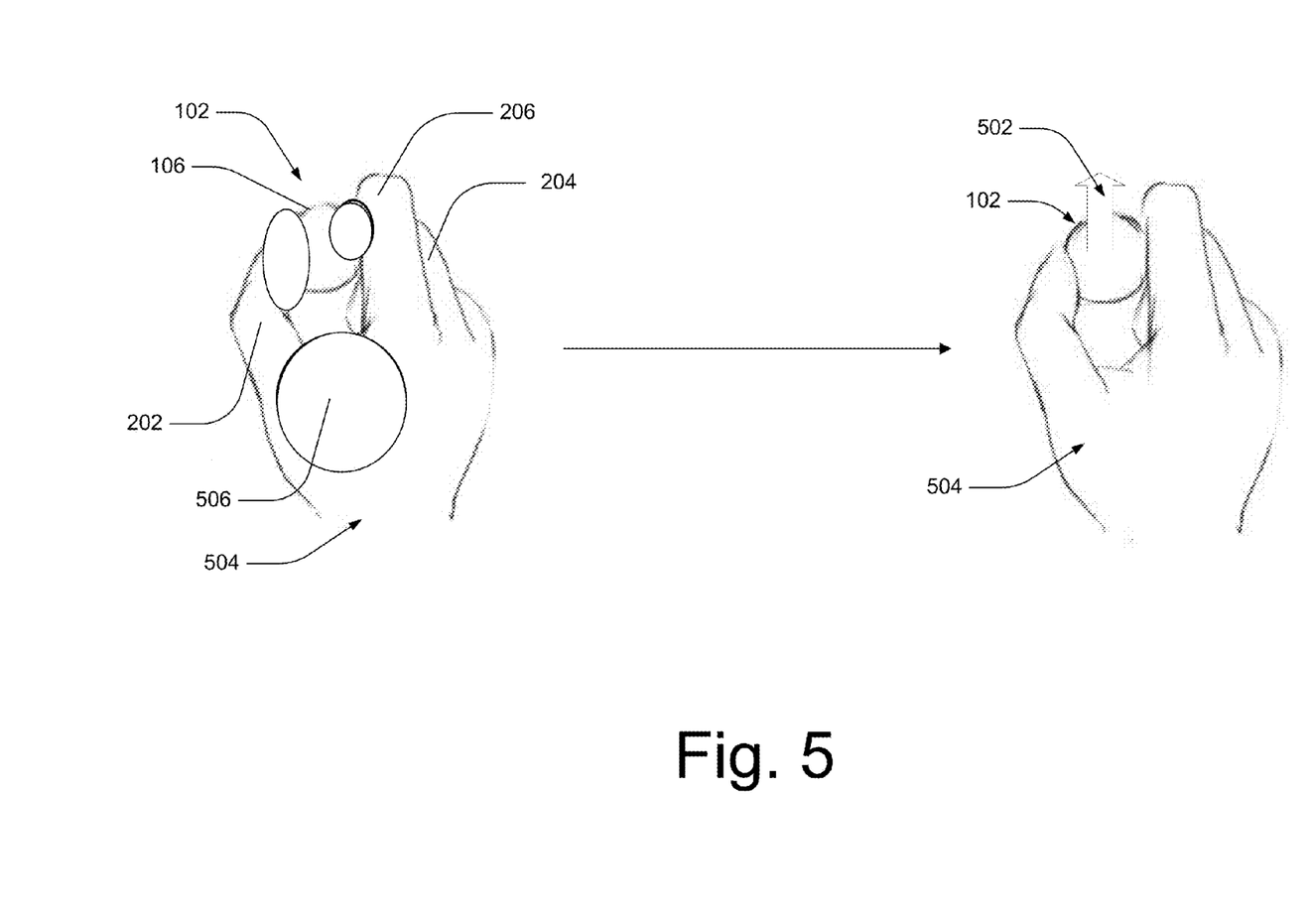
FIG. 5 is a diagram showing an exemplary calibration technique using hand capacitive pattern detection.

FIG. 5 shows one exemplary calibration method in which calibration logic 416 is responsive to one or more of the touch-sensitive surfaces of input device 102 to determine an orientation 502 of input device 102 relative to a user's hand 504. The left side of this figure illustrates manipulation of input device 102 to achieve calibration, while the right side of FIG. 5 illustrates the results of the calibration.

In the example of FIG. 5, circumference 106 of input device 102 is held between thumb 202 and middle finger 204 or index finger 206 of the user's hand. Touch-sensitive circumference 106 senses how input device 102 is held in the user's hand based on side touch sensor 306 and transmits such sensor data to calibration logic 416. Specifically, calibration logic 416 determines which portions of circumference 106 are being touched. This information, referred to as a holding pattern or holding capacitive pattern, is analyzed to determine the orientation of input device 102 relative to the user.

The holding pattern shows how the user's fingers such as thumb 202, middle finger 204, index finger 206, and possibly palm 506 touch circumference 106. When the user naturally holds input device 102, sensor data from side touch sensor 306 shows a certain pattern from which relative angular orientation of input device 102 can be determined. During testing, it is possible to compile statistics regarding holding patterns and the corresponding orientations. During operation, statistics such as these can be used to continuously update the orientation of input device 102 based on the holding pattern.

As a simple example, assume that side touch sensor 306 has six discrete segments, each of which produces a signal in the range of zero to one, depending on the degree of contact with that segment. Calibration logic 416 thus receives six inputs. Based on testing, it has been found that when input device 102 is held between two fingers, the sensors (numbered sequentially from one to six) produce the following signals when the device is held with the indicated orientation.

TABLE 1

Holding Templates from Different Angles

| | Sensor ID: | | | | | |
|---|---|---|---|---|---|---|
| Angle | 1 | 2 | 3 | 4 | 5 | 6 |
| 0 | 0 | 1 | 0.2 | 0 | 1 | 1 |
| 60 | 1 | 0.2 | 0 | 1 | 1 | 0 |
| 120 | 0.2 | 0 | 1 | 1 | 0 | 1 |
| 180 | 0 | 1 | 1 | 0 | 1 | 0.2 |
| 240 | 1 | 1 | 0 | 1 | 0.2 | 0 |
| 300 | 1 | 0 | 1 | 0.2 | 0 | 1 |

During operation, actual sensor data is compared to a template table such as this. The convolution of the actual sensor data with each row of the template table is calculated. The row giving the highest convolution is assumed to correspond to the actual orientation of input device 102 relative to the user's hand.

More complex tables can be constructed, based on finer angular resolutions and higher numbers of discrete sensor segments. Other statistical models may also be used.

The dynamic accuracy of this calibration can be enhanced by using signals from gyroscope 314. Gyroscope 314 senses turning of input device 102 and transmits such sensor data to calibration logic 416. Calibration logic 416 samples the sensor data from gyroscope 314 to obtain an angular speed. These sampled angular speeds can be integrated to indicate relative angular position.

To accurately track orientation 502 of input device 102 relative to user's hand 504, calibration logic 416 can use both the integration of angular speed and the hand pattern. Thus, moving input device 102 sideways will be reported as such, even after the device is rotated to different angles.

Once input device 102 is calibrated in this manner, data regarding its movement is reported relative to the determined orientation.

Figure 6:
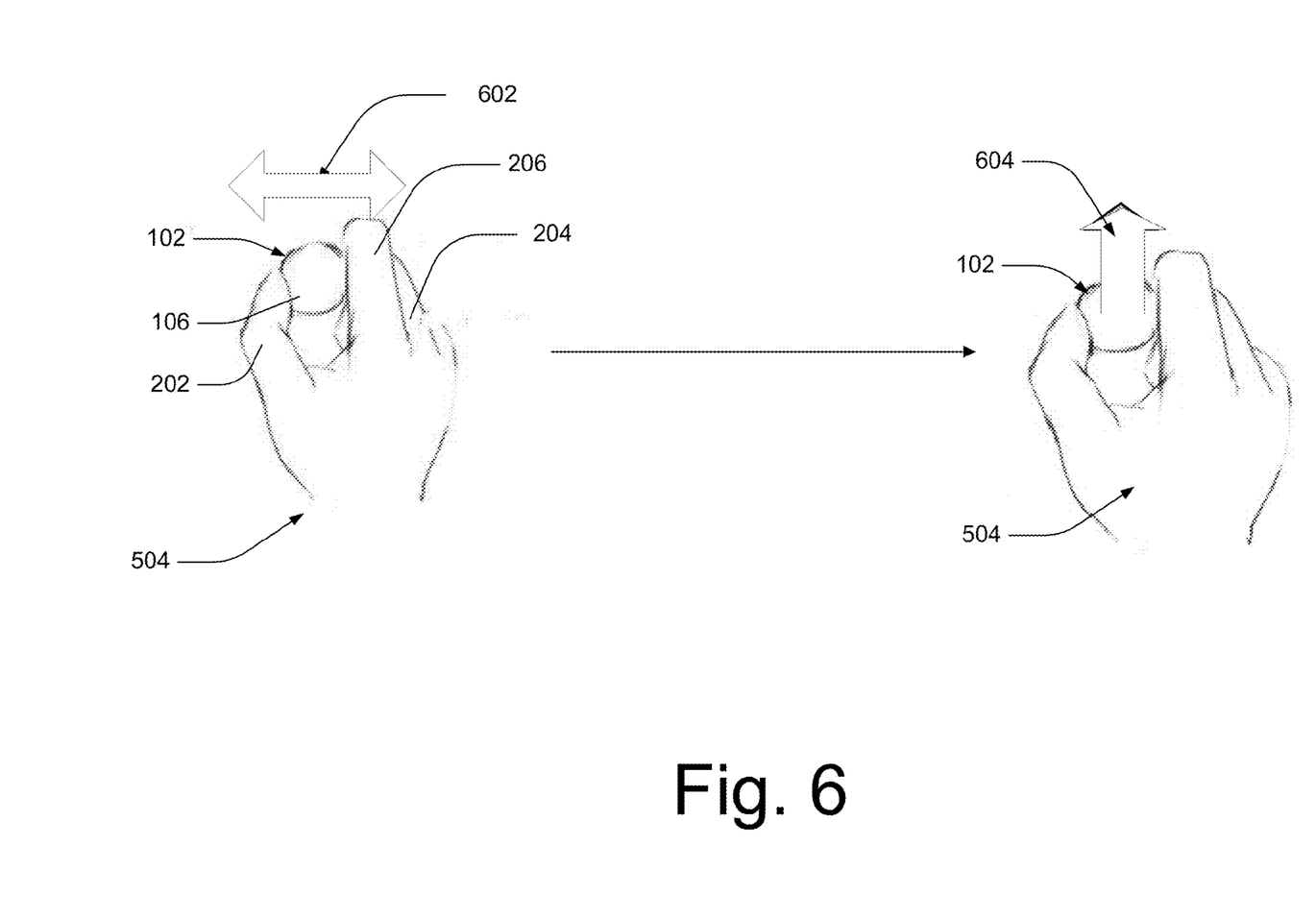
FIG. 6 is a diagram showing an exemplary calibration technique based on lateral shaking of the exemplary human input device.

FIG. 6 shows another exemplary method of calibrating or detecting angular orientation of input device 102. In this method, the calibration logic 416 is responsive to tri-axial accelerometer 312 to determine orientation of input device 102 relative to the human hand in response to shaking of input device 102 along a lateral or sideways axis. Using this method, the user again holds input device 102 between thumb 202 and middle finger 204 or index finger 206. The user then shakes input device 102 back and forth along a lateral axis 602. Tri-axial accelerometer 312 detects the shaking and transmits its sensor data to calibration logic 416. Calibration logic 416 determines the direction of the shaking and assumes that the device has been shaken at an angle of approximately 90 degrees relative to the extension of the user's arm. Once this orientation 604 is determined, gyroscopic data and accelerometer data can be used to continuously update angular position. Accumulated errors can be corrected for by the user periodically shaking the device to recalibrate it.

Figure 7:
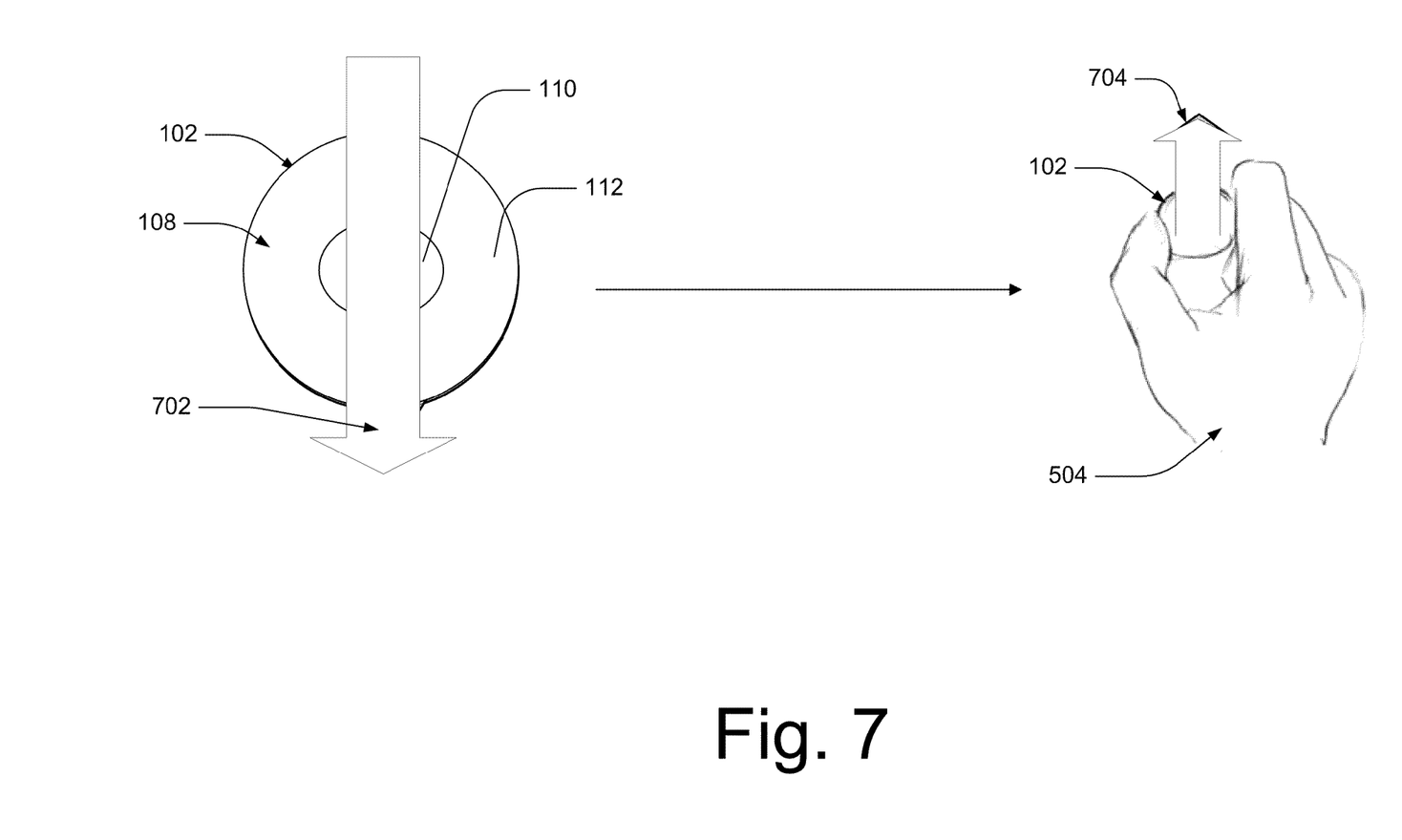
FIG. 7 is a diagram showing an exemplary calibration technique based on a user sliding their finger over the top surface of the exemplary input device.

FIG. 7 shows yet another exemplary method of calibrating or detecting angular orientation of input device 102. Using this method, calibration logic 416 is responsive to touch-sensitive top 108 to determine orientation of input device 102 relative to the human hand in response to sliding a finger of the human hand over the top of the puck-shaped body 104.

In the example of FIG. 7, the user holds input device 102 and slides their finger over top surface 108 toward away from the user, crossing inner surface 110 and outer surface 112. Both inner surface 110 and outer surface 112 are touch-sensitive surfaces and transmit the user's finger movement track 702 to calibration logic 416. Calibration logic 416 processes the received sensor data to determine the direction or angular orientation in which the slide occurred. Calibration logic 416 then assumes this to correspond approximately to the angular orientation of the user's arm. Once this orientation 704 is determined, gyroscopic data and accelerometer data can be used to continuously update angular position. Accumulated errors can be corrected for by the user periodically sliding their finder over top surface 108 for recalibration.

Power Management

In one embodiment, when various sensors of input device 102 do not detect user's operation or movement of input device 102 for a period of time, control logic 414 of input device 102 will make input device 102 enter into a sleep mode to save power. When the user finger slide through top surface 108, or shakes input device 102, the device will restore full operation and enter into normal operational mode.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A computer mouse, comprising:
    a surface movement sensor positioned to detect movement of the computer mouse across a surface upon which the computer mouse is placed;
    an action button; and
    a height sensor that detects a height of the computer mouse relative to the surface in response to the computer mouse being raised from the surface, wherein the height sensor is associated with zooming functionality for a display.

2. The computer mouse as recited in claim 1, further comprising a puck-shaped body sized to be grasped by its circumference between two fingers of a human hand.

3. The computer mouse as recited in claim 1, further comprising:
    a puck-shaped body sized to be grasped by its circumference between two fingers of a human hand; and
    a gyroscope that senses rotation of the computer mouse.

4. The computer mouse as recited in claim 1, further comprising one or more sensors for determining angular orientation of the computer mouse relative to a human hand.

5. The computer mouse as recited in claim 1, further comprising one or more touch-sensitive sensors.

6. The computer mouse as recited in claim 1, further comprising an accelerometer that senses translation of the computer mouse.

7. The computer mouse as recited in claim 1, further comprising one or more touch-sensitive side surfaces for determining orientation of the computer mouse relative to a human hand.

8. The computer mouse as recited in claim 1, further comprising a touch-sensitive top.

9. The computer mouse as recited in claim 8, wherein the touch-sensitive top comprises an inner touch-sensitive surface and an outer touch-sensitive surface.

10. The computer mouse as recited in claim 1, further comprising a compass that senses geographic orientation of the computer mouse.

11. A computer mouse, comprising:
    a puck-shaped body sized to be grasped by its circumference between two fingers of a human hand;
    a surface movement sensor positioned to detect movement of the computer mouse across a surface upon which the computer mouse is placed;
    an action button;
    a height sensor that detects height of the computer mouse relative to the surface when the computer mouse is raised from the surface;
    a gyroscope that senses rotation of the computer mouse; and
    one or more touch-sensitive surfaces around the circumference of the puck-shaped body.

12. The computer mouse as recited in claim 11, further comprising an accelerometer that senses translation of the computer mouse.

13. The computer mouse as recited in claim 11, further comprising a compass that senses geographic orientation of the computer mouse.

14. The computer mouse as recited in claim 11, wherein the body has a touch-sensitive top that comprises an inner touch-sensitive surface and an outer touch-sensitive surface that surrounds a central touch-sensitive surface.

15. The computer mouse as recited in claim 14, wherein the inner touch-sensitive surface is pressable to form an action button.

16. The computer mouse as recited in claim 14, wherein the outer touch-sensitive surface is pressable to form an action button.

17. The computer mouse as recited in claim 11, further comprising one or more sensors for determining angular orientation of the computer mouse relative to a human hand.

18. The computer mouse as recited in claim 11, wherein the height sensor is associated with zooming functionality for a display.

19. The computer mouse as recited in claim 11, wherein the height sensor is associated with switching windows on a display.

20. The computer mouse as recited in claim 11, wherein the height sensor is associated with selecting a menu item on a display.

* * * * *